United States Patent
Lee et al.

(10) Patent No.: US 10,978,810 B2
(45) Date of Patent: Apr. 13, 2021

(54) MILLIMETER-WAVE DETECT OR REFLECT ARRAY

(71) Applicant: Keysight Technologies, Inc., Santa Rosa, CA (US)

(72) Inventors: Gregory S. Lee, Mountain View, CA (US); Paul L. Corredoura, Redwood City, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 41 days.

(21) Appl. No.: 16/547,681

(22) Filed: Aug. 22, 2019

(65) Prior Publication Data

US 2020/0136263 A1 Apr. 30, 2020

Related U.S. Application Data (60) Provisional application No. 62/751,796, filed on Oct. 29, 2018.

(51) Int. Cl.
*H01Q 19/10* (2006.01)
*H01Q 3/26* (2006.01)
*H01Q 15/00* (2006.01)

(52) U.S. Cl.
CPC ......... *H01Q 19/104* (2013.01); *H01Q 3/2635* (2013.01); *H01Q 15/002* (2013.01)

(58) Field of Classification Search
CPC ...... H01Q 3/26; H01Q 3/2605; H01Q 3/2611; H01Q 3/2629; H01Q 3/2636; H01Q 3/2641; H01Q 3/2658; H01Q 19/06; H01Q 19/10; H01Q 19/104; H01Q 15/0006; H01Q 15/0013; H01Q 15/002; H01Q 1/247; H01Q 1/3233; G01S 13/88; G01S 13/89

See application file for complete search history.

(56) References Cited

U.S. PATENT DOCUMENTS

| | | | |
|---|---|---|---|
| 5,170,169 A | 12/1992 | Stephan | |
| 6,037,905 A | 3/2000 | Koscica et al. | |
| 7,746,266 B2* | 6/2010 | Zoughi | G01S 13/887 342/22 |
| 10,243,412 B1* | 3/2019 | Fink | H02J 7/025 |
| 2003/0011528 A1* | 1/2003 | Marchand | H01Q 9/16 343/793 |

(Continued)

OTHER PUBLICATIONS

Shinya Kitagawa et al., "Study on RCS Reduction of Patch Array Using Switchable Absorption/Tranmission Surface", IEICE Trans. Electron., vol. E99-C, No. 7, Jul. 2016, pp. 805-808.

(Continued)

*Primary Examiner* — Jason Crawford (57) ABSTRACT

A device for selectively reflecting an incident microwave signal or millimeter-wave signal includes multiple antennae disposed in an array. Each antenna has an input adapted to selectively receive a forward bias signal or a zero bias signal. The device also includes a diode disposed at each input of each antenna. The device also includes a switching device connected to each input, and configured to selectively apply a forward bias or zero bias to each of the diodes. In forward bias, each of the antennae detects the incident microwave signal or millimeter wave signal, and in zero bias, each of the antennae reflects the incident microwave signal or millimeter wave signal.

17 Claims, 8 Drawing Sheets

(56) References Cited

U.S. PATENT DOCUMENTS

| | | | | |
|---|---|---|---|---|
| 2007/0195004 A1* | 8/2007 | Rebeiz | .................. | H01Q 3/245 |
| | | | | 343/876 |
| 2008/0150800 A1* | 6/2008 | Tsuji | ..................... | H01Q 21/08 |
| | | | | 342/368 |
| 2010/0045561 A1* | 2/2010 | Ratajczak | ............. | H01Q 15/24 |
| | | | | 343/834 |
| 2011/0050499 A1* | 3/2011 | Jun | ......................... | H01Q 3/22 |
| | | | | 342/375 |
| 2014/0231627 A1* | 8/2014 | Wakatsuki | ................ | G01J 1/44 |
| | | | | 250/208.2 |
| 2019/0128999 A1* | 5/2019 | Horst | ................. | G01S 13/9011 |
| 2020/0021370 A1* | 1/2020 | Huynh | .................. | H04B 17/17 |

OTHER PUBLICATIONS

Akiko Kohmura et al."Prototype Measurement of Active Reflectarray Antenna using a Diode Grid in the W-band", Proceedings of ISAP2016, Okinawa, Japan, 2016, pp. 822-823.

Restriction Requirement dated Oct. 27, 2020, for U.S. Appl. No. 16/778,648, 14 pgs.

Chinese Notice of Decision to Grant Received dated Sep. 28, 2020 with English translation for Chinese App. No. 201921731502.6, 4 pgs.

* cited by examiner

MILLIMETER-WAVE DETECT OR REFLECT ARRAY

CROSS REFERENCE TO RELATED APPLICATIONS

The present application claims priority under 35 U.S.C. § 119(e) to U.S. Provisional Application No. 62/751,796, filed on Oct. 29, 2018, and naming Gregory S. Lee, et al. inventors. The entire disclosure of U.S. Provisional Application No. 62/751,796 is hereby specifically incorporated by reference in its entirety.

BACKGROUND

Automotive radars are currently deployed in autos for assistance in parking and collision avoidance. Additionally, driverless cars are currently being developed, and these types of cars may incorporate such automotive radars. While lidar may play a role in this scenario, it is generally conceded that radar has the clear advantage in fog and offers the unique ability to determine relative velocity due to the Doppler effect. Each car may be equipped with as many as a dozen automotive radar modules around the perimeter of the car. Thus, auto manufacturers are preparing for when they will soon be installing millions of radar units inside car bodies (in the bumpers, doors, etc.).

Auto radars mainly operate near 77 GHz, although there are short range radars (SRRs) at 24 GHz and there may be future offerings at 120 GHz. At all these millimeter-wave frequencies, the thickness of the plastic composites used in the car bumpers and doors is comparable to or larger than the wavelength. Furthermore, this thickness is not very tightly controlled (from an electromagnetic radiation standpoint) and the surfaces are highly curved. These factors imply that the directional performance of a radar module as tested before it is installed in the car part will change after installation.

Particularly, direction of arrival (DOA) of a target is an important parameter to estimate, especially for mid-range radars (MRRs) and long-range radars (LRRs). For long-range radars the desired azimuthal accuracy is 0.1°. Car manufacturers now mechanically translate corner reflectors as test targets to test the installed radar accuracy. The corner reflector distance must be at least 1 m to avoid deleterious diffraction/scattering effects from its edges and outer walls. A shorter test distance would be desirable as this would save space on the automotive assembly line. There is a tradeoff between positioning accuracy, needed to establish the rigorous relative angle, and demands for speed typical of assembly lines to maintain throughput. Multi-target testing in an assembly line environment has been discussed, but slinging multiple corner reflectors around in such an environment becomes even more problematic.

All scenarios envision the mid-range radars placed in the bumper corners, four per vehicle. The plastic curvature is so high in these areas that the corners act as uncontrolled millimeter-wave lenses. For these radar units, even the raw transmit beams may be severely distorted. Thus, analogous to the "headlight tweaking" that the auto industry is accustomed to, carmakers envision tweaking the transmit arrays of installed radars to compensate for beam skew. At present, they have no method to measure the installed module transmit pattern that is sufficiently inexpensive, small, and fast.

In fact, space, time, and cost are of such concern on the assembly line that a system/method that can test both the radar transmit beam pattern and its full (transmit/receive roundtrip) angular accuracy is highly desirable. If separate test equipment is needed to test the various radar functionalities, one can appreciate that assembly line space is wasted and testing time and cost increase.

Moreover, the cars discussed above are assumed to be pristine vehicles that are just being readied to ship. Upon ownership, accidents or just plain denting will occur so body work will be needed. For example, one or more radars may be damaged in an accident and need replacing. Even if all the car's radars survive intact, new bumpers, new paint, etc. will change their performance. A typical body shop can less afford equipment cost, time, and space than an assembly line, yet "radar touchup" will be required. One can appreciate that the needs highlighted in the previous paragraphs become even more acute.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Figure 1A:
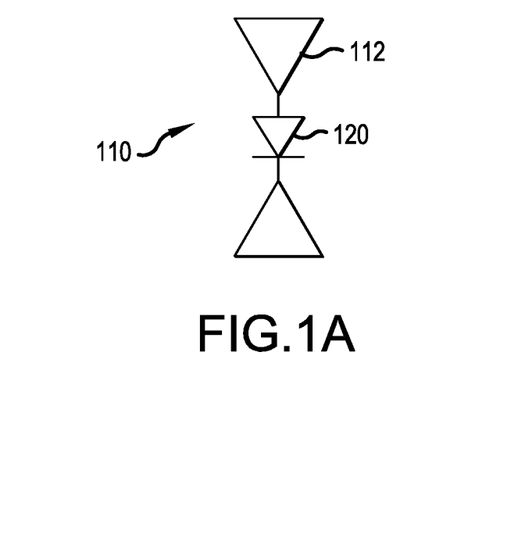
FIG. 1A illustrates an antenna-diode pair for an antenna-coupled diode used in a two-dimensional array of antenna-coupled diodes, in accordance with a representative embodiment.

FIG. 1A illustrates an antenna-diode pair for an antenna-coupled diode used in a two-dimensional array of antenna-coupled diodes, in accordance with a representative embodiment.

In FIG. 1A, the antenna-diode pair 110 includes an antenna 112 and a diode 120. The diode 120 is coupled to the antenna 112 and is therefore an antenna-coupled diode. The diode 120 may be a zero bias or a reverse biased Schottky diode and the antenna 112 may be a patch antenna.

Figure 1B:
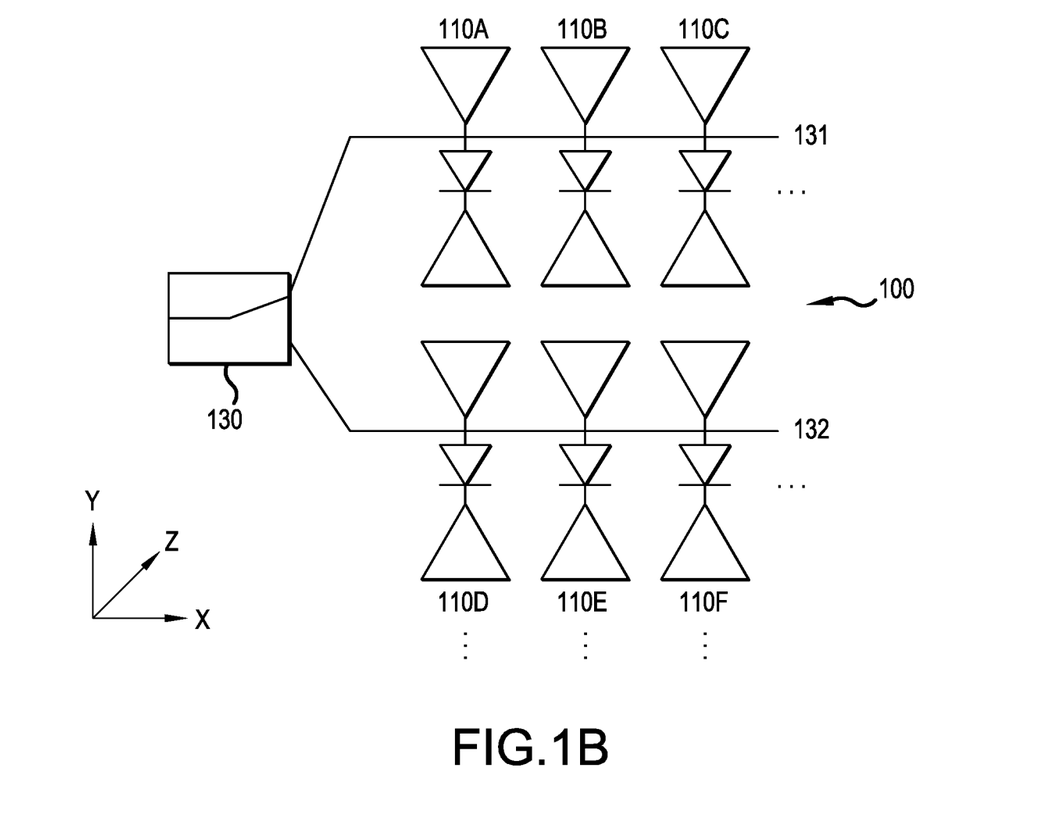
FIG. 1B illustrates a two-dimensional array of antenna-diode pairs used in a two-dimensional array of antenna-coupled diodes, in accordance with a representative embodiment.

FIG. 1B illustrates a two-dimensional array of antenna-diode pairs used in a two-dimensional array of antenna-coupled diodes, in accordance with a representative embodiment.

In FIG. 1B, an antenna-diode pair array 100 includes antenna/diode pair 110A, antenna/diode pair 110B, antenna/diode pair 110C, antenna/diode pair 110D, antenna/diode pair 110E, and antenna/diode pair 110F. The view in FIG. 1B is the top view of the antenna-diode pair array 100, corresponding to the X (width) dimension and the Y (height) direction. The antenna-diode pair array 100 is shown as a two-dimension array of antenna-diode pairs in FIG. 1B. The antenna-diode pair array 100 is coupled to a switching device 130 which is used to individually control the antenna/diode pairs of the antenna-diode pair array 100. The switching device 130 includes or is coupled to first signal line 131 and second signal line 132. The first signal line 131 and the second signal line 132 may carry signals to individually control the antenna/diode pairs of the antenna-diode pair array 100.

Insofar as the antenna-diode pair array 100 includes both antennae and diodes, the antenna-diode pair array 100 also includes multiple antennae disposed in an array and multiple diodes disposed in an array. Each antenna in the antenna-diode pair array 100 includes an input adapted to selectively receive a forward bias signal or a zero bias or reverse bias signal. Each diode in the antenna-diode pair array 100 is disposed at an input of a corresponding antenna.

The switching device 130 is connected to each input and is configured to selectively apply a forward bias or zero bias or reverse bias to each of the diodes. In forward or reverse bias, each of the antennae in the antenna-diode pair array 100 detects the incident microwave signal or millimeter wave signal. In forward bias each of the antennae in the antenna-diode pair array 100 reflects the incident microwave signal or millimeter wave signal.

Although the antenna-diode pair array 100 is shown in FIG. 1B to include six antenna/diode pairs, an antenna-diode pair array 100 may include many more than six antenna/diode pairs. The antenna/diode pairs of the antenna-diode pair array 100 may be arranged in rows and columns and may be controlled individually and/or in the rows and/or columns. That is, the antenna-diode pair array 100 may include a series of rows and a series of columns. The antennae in each of the series of rows may be addressable by the switching device 130. In forward bias, the addressed rows may detect the incident microwave signal or millimeter wave signal. In forward bias, the addressed rows reflect the incident microwave signal or millimeter wave signal. Additionally, the antennae in each of the series of columns may be addressable by the switching device 130. In zero or reverse bias, the addressed columns detect the incident microwave signal or millimeter wave signal. In forward bias, the addressed columns reflect the incident microwave signal or millimeter wave signal.

In FIG. 1B, bias/sense address lines are not shown in the antenna-diode pair array 100. Each of antenna/diode pair 110A, antenna/diode pair 110B, antenna/diode pair 110C, antenna/diode pair 110D, antenna/diode pair 110E, and antenna/diode pair 110F can either be left at zero or reverse bias in detect mode or forward biased in reflect mode. The individual antenna/diode pairs may be spaced about one-half wavelength in either direction. Alternatively, the individual antenna/diode pairs may be spaced from one another by approximately one quarter wavelenth in either direction. Whether the spacing is approximately one-half wavelength or one-quarter wavelength, the wavelength used as a referecnce is the wavelength of the microwave signal or millimeter wave signal. Additionally, when the spacing is one-half wavelength, the device under test (DUT) which emits the microwave signal or millimeter wave signal may transmit a single beam such as a single main beam.

At sufficient forward bias, each diode 120 is effectively a short circuit. In the mode with the sufficient forward bias, the corresponding antenna simply reflects the locally impinging radiation. By forward biasing selected elements while leaving the remainder of the array at zero or reverse bias, a local mirror (or mirrors) is created because the zero or reverse bias elements act like absorbers. The mirror(s) electronically created using the antenna-diode pair array 100 acts as the test target.

One can electronically change the position, size, shape, and number of mirrors extremely quickly and precisely because there are no moving parts. Changing the mirror position is simply a matter of electronically addressing the desired element(s) to put into forward bias. The effective mirror size, which may be important as carmakers test radar cross section (RCS), is determined by the number of contiguous elements in forward bias. If any of the following criteria is satisfied, neighbor elements act from an RF standpoint as if they are continuous rather than discrete:

1. Spacing is $\lambda/4$ or less.
2. Device under test (DUT) transmits a single main beam and spacing is $\lambda/2$ or less.
3. Array is at least $D^2/\lambda$ away from the radar and spacing is $\lambda/2$ or less.

Here D is the diameter of the larger of the transmit and receive arrays constituting the radar being tested and $\lambda$ is the wavelength. In practice, both the latter two criteria are met. For example, one typically sees D≅28 mm for $\lambda$=3.92 mm (the wavelength at 76.5 GHz), meaning $D^2/\lambda$=0.2 m. This is well below the present testing distance with corner reflectors of 1 m or more; furthermore, radars today look for multiple targets by using advanced signal processing algorithms rather than by transmitting multi-beam patterns. Hence, $\lambda/2$ spacing in the two-dimensional array may suffice.

Shape is likely not something that carmakers will exploit, but this is also easily varied. One simply chooses a piecewise linear perimeter for the contiguous set of elements that closely matches the desired smooth shape. Finally, multi-target testing may become necessary; the number of mirrors is simply the number of separate contiguous forward bias zones in the array.

Providing the multitude of bias/sense lines for a multi-function array can be a nightmare, especially if the addressing must be differential and millimeter-wave signals are involved. Care must be taken to render the bias/sense lines "invisible" to the radar. This difficult task is exacerbated by the fact that surface mount inductors do not work at 77 GHz. (These are normally inserted to choke off the RF from the low-speed signal lines.)

In FIG. 1B above, an antenna-diode pair array 100 includes an array of (patch) antenna-coupled diodes. Each element in the antenna-diode pair array 100 is an antenna—diode pair and can be operated in either a detection mode or a reflection mode. Each antenna 112 in the array may be spaced approximately one-half wavelength apart from each adjacent antenna in the antenna-diode pair array 100 in each of two lateral dimensions. Each diode 120 may be a so-called zero bias Schottky diode. As the name implies, at zero bias one can use a zero bias Schottky diode as a video or square law detector. In this mode, each antenna-diode pair 110 acts as the well-known rectenna, which stand for "rectifying antenna". The antenna-diode pair 110 outputs a rectified voltage in proportion to the power locally received by the antenna 112 of the antenna-diode pair 110. Since each antenna-diode pair 110 is in an antenna-diode pair array 100, the two-dimensional addressing of the rectified voltages provides a global radiation power image—thus providing a millimeter-wave camera. This "camera" can be used to image the transmit radiation pattern, e.g., from a radar installed in the corner of a car bumper or other body part.

Figure 2A:
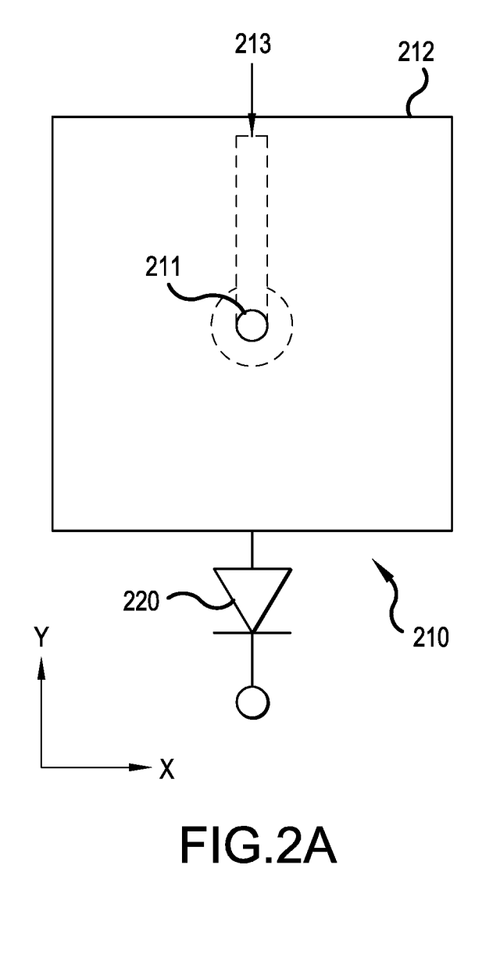
FIG. 2A illustrates a top view of geometry of an antenna-diode pair with a tapped antenna on a printed circuit board, in accordance with a representative embodiment.

FIG. 2A illustrates a top view of geometry of a patch antenna-diode pair with a tapped patch antenna on a printed circuit board, in accordance with a representative embodiment.

In FIG. 2A, a patch antenna-diode pair 210 includes a patch antenna 212 and a diode 220. An input 211 is shown as a circle at or near the center of the patch antenna 212, and a bias/sense line 213 that ends at the input 211 is outlined by broken segments. The diode 220 is connected with or otherwise coupled to the patch antenna 212 to form the patch antenna-diode pair 210.

Figure 2B:
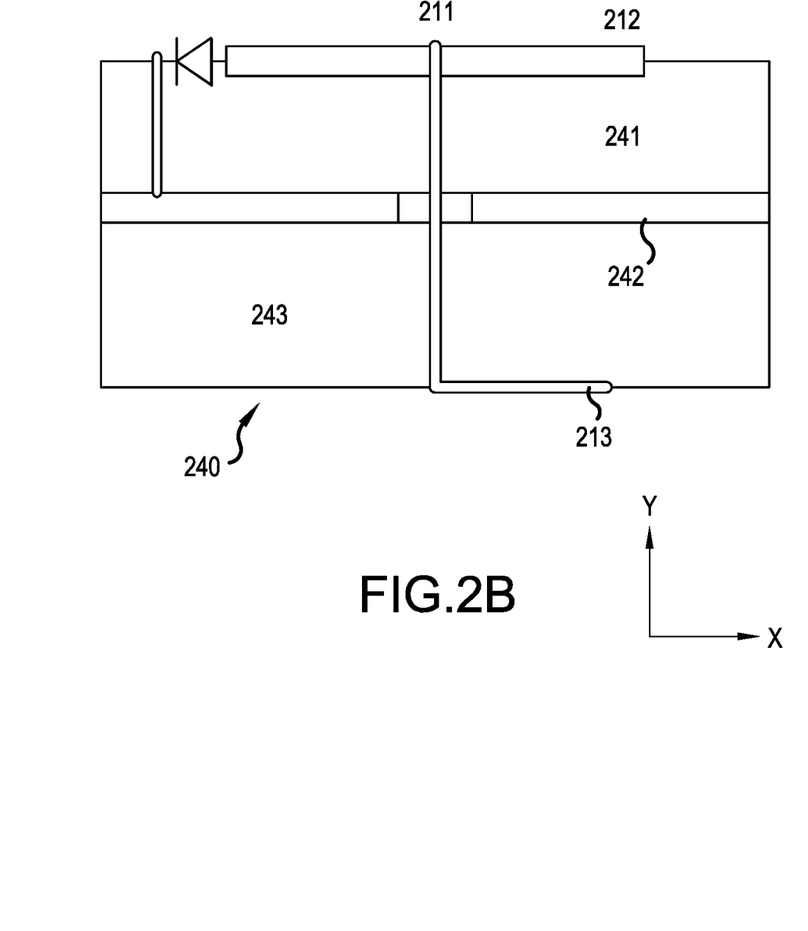
FIG. 2B illustrates a front view of geometry of the antenna-diode pair with the tapped antenna on a printed circuit board of FIG. 2A, in accordance with a representative embodiment.

Printed circuit board (PCB) technology is becoming very popular for various microwave applications. In the millimeter-wave region, patch antennas cannot be directly put onto conventional FR-4 material since it is too lossy. However, designs with patch antenna arrays on low-loss laminate material stacked with FR-4 into multilayer boards are becoming common. Surface mount diodes, commonly used at lower frequencies, are beginning to appear at millimeter-wave frequencies. FIG. 2B illustrates a view that includes a PCB with FR-4 and low-loss laminate layers.

FIG. 2B illustrates a front view of geometry of the antenna-diode pair with the tapped antenna on a printed circuit board of FIG. 2A, in accordance with a representative embodiment.

In FIG. 2B, the bias/sense line 213 that ends at the input 211 is shown rising through a printed circuit board to end at the antenna 212. The printed circuit board includes, in order, an FR-R material 243, a ground layer 242, and a low-loss laminate 241.

In FIG. 2A, the view from the top is defined by the X (width) and Y (depth) directions. In FIG. 2B, the view from the front is defined by the X (width) and Z (height) directions.

In FIGS. 2A and 2B a simple method is shown for single-ended addressing of each patch antenna-diode pair that avoids inductive choking. Specifically, in the geometry of an actual element in FIGS. 2A and 2B, grounding is shown via (green) and patch center-tapping is shown with a bias/sense via.

A symmetry feature of patch antennas is invoked in FIGS. 2A and 2B. Namely, the center of the antenna 212 (patch antenna) is an RF voltage null. A tap via delineated as a circle bounded by broken lines in FIG. 2A is placed at this central point, so that the diode 220 can be biased or the rectified voltage of the diode 220 can be sensed without disturbing the RF fields or allowing them to leak onto the bias/sense line 213. In other words, an input of the antenna 212 is disposed at a center-tap of the antenna 212, and this may be true of each antenna in the antenna-diode pair array 100. Bringing the tap via through the ground layer 242 (RF ground plane) and out the backside of the PCB 240 allows isolation of all bias/sense signals from the radiation. The measuring in the detecting mode may include measuring only a direct current voltage at the center tap, as the magnitude of the direct current voltage will be proportional to the magnitude of the microwave signal or millimeter wave signal from the DUT. All layers of the PCB 240 beneath the ground layer 242 (RF ground plane) can be FR-4 since only layers starting with and above the ground layer 242 (RF ground plane) are relevant to the millimeter waves.

In reality, the diode 220 placed at the RF feed point of the antenna 212 may slightly break the symmetry. This effect can be modelled with software that simulates electromagnetic effects, and the effect can be compensated by a slight offset in the position of the tap via. In practice at 77 GHz, this offset winds up being less than a mil in the direction opposite the diode 220.

Figure 3A:
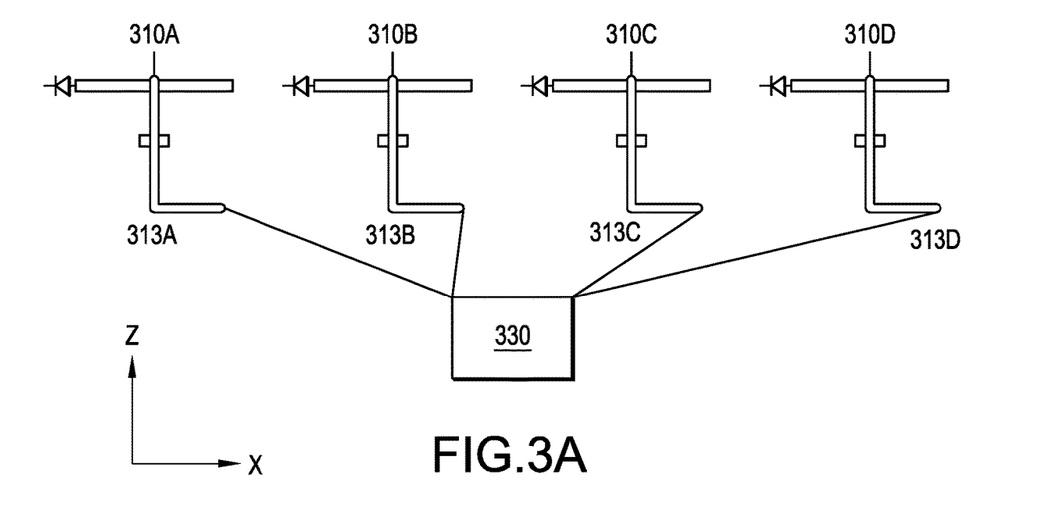
FIG. 3A illustrates a front view of a two-dimensional array of antenna-diode pairs used in a two-dimensional array of antenna coupled diodes, in accordance with a representative embodiment.

FIG. 3A illustrates a front view of a two-dimensional array of antenna-diode pairs used in a two-dimensional array of antenna coupled diodes, in accordance with a representative embodiment.

In FIG. 3A, a first antenna-diode pair 310A, a second antenna-diode pair 310B, a third antenna-diode pair 310C, and a fourth antenna-diode pair 310D form a row of antenna-diode pairs in the antenna-diode pair array 100 in the X (width) direction. A first bias/sense line 313A, a second bias/sense line 313B, a third bias/sense line 313C, and a fourth bias/sense line 313D respectively end in the inputs to the first antenna-diode pair 310A, a second antenna-diode pair 310B, a third antenna-diode pair 310C, and a fourth antenna-diode pair 310D. A switching device 330 switches the first bias/sense line 313A, the second bias/sense line 313B, the third bias/sense line 313C, and the fourth bias/sense line 313D between biasing and sensing either individually or as a row.

The row shown in FIG. 3A is representative of multiple rows in an antenna-diode pair array 100. Additionally, while only four antenna-diode pairs are shown in FIG. 3A, it will be understood that rows of the antenna-diode pair array 100 may include more than four antenna-diode pairs or fewer than four antenna-diode pairs without departing from the spirit of the teachings of the present disclosure.

Figure 3B:
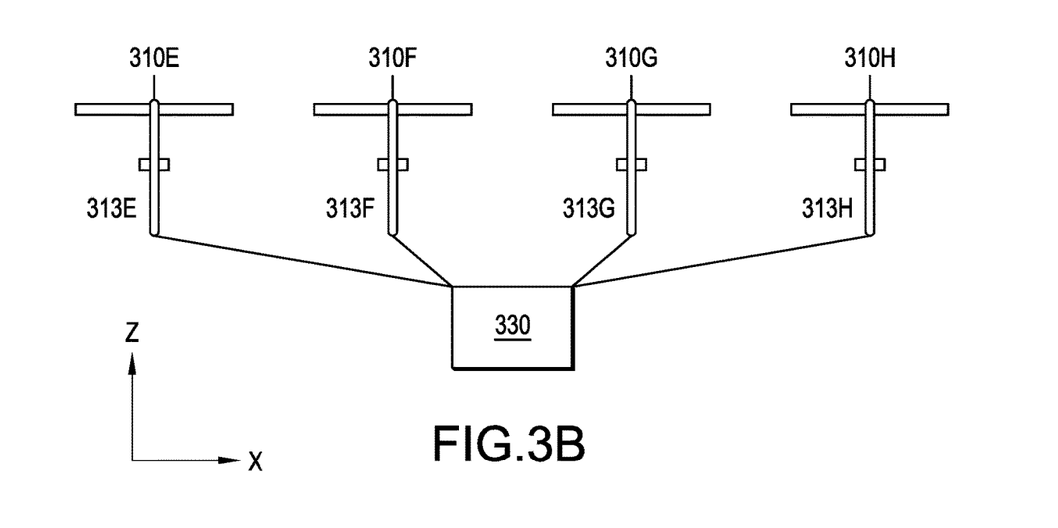
FIG. 3B illustrates a side view of the two-dimensional array of antenna-diode pairs used in a two-dimensional array of antenna coupled diodes of FIG. 3B, in accordance with a representative embodiment.

FIG. 3B illustrates a side view of the two-dimensional array of antenna-diode pairs used in a two-dimensional array of antenna coupled diodes of FIG. 3B, in accordance with a representative embodiment.

In FIG. 3B, a fifth antenna-diode pair 310E, a sixth antenna-diode pair 310F, a seventh antenna-diode pair 310G, and an eighth antenna-diode pair 310H form a column of antenna-diode pairs in the antenna-diode pair array 100 in the Z (depth) direction. A fifth bias/sense line 313E, a sixth bias/sense line 313F, a seventh bias/sense line 313G, and an eighth bias/sense line 313H respectively end in the inputs to the fifth antenna-diode pair 310E, the sixth antenna-diode pair 310F, the seventh antenna-diode pair 310G, and the eighth antenna-diode pair 310H. A switching device 330 switches the fifth bias/sense line 313E, the sixth bias/sense line 313F, the seventh bias/sense line 313G, and the eighth bias/sense line 313H between biasing and sensing either individually or as a column.

The column shown in FIG. 3B is representative of multiple columns in an antenna-diode pair array 100. Additionally, while only four antenna-diode pairs are shown in FIG. 3B, it will be understood that columns of the antenna-diode pair array 100 may include more than four antenna-diode pairs or fewer than four antenna-diode pairs without departing from the spirit of the teachings of the present disclosure.

Figure 4:
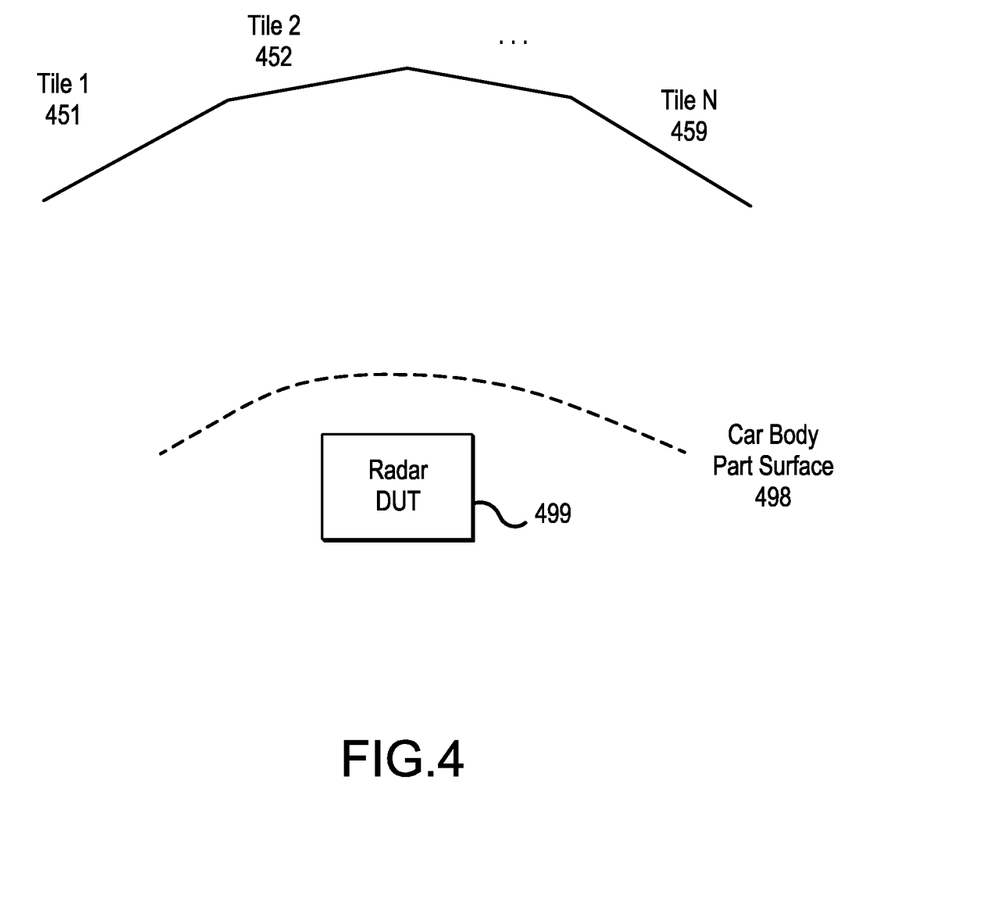
FIG. 4 illustrates a piecewise flat surface on which subarrays of the two-dimensional array of FIG. 1B are fabricated, in accordance with a representative embodiment.

FIG. 4 illustrates a piecewise flat surface on which subarrays of the two-dimensional array of FIG. 1B are fabricated, in accordance with a representative embodiment.

For retroreflection, it may be desirable to fabricate the antenna-diode pair array 100 as a two-dimensional array on a curved surface. Perfect retroreflection is not necessary. For example, even a corner reflector isn't perfect due to diffraction/scattering effects. Moreover, real targets are not typically perfect retroreflectors. Accordingly, a curved surface of a car body part surface 498 can be coarsely approximated with a piecewise flat surface as shown by the tiles including Tile 1 451, Tile 2 452 up to Tile N 459 as in FIG. 4. The tiles from Tile 1 451 to Tile N 459 may be flat subarray tiles arranged to inscribe or circumscribe either a sphere or a cylinder, creating a piecewise flat sphere or a piecewise flat cylinder, respectively. In other words, in FIG. 4, multiple arrays of antennae are provided by the tiles from Tile 1 451 to Tile N 459. Each of the multiple arrays may be considered a sub-array, and each of the multiple arrays of antennae are substantially flat but together form a curved array when placed adjacent to each other. Even though the resultant array is curved, the array may still be considered a two-dimensional array in that the elements of the array are still arranged in two dimensions in each sub-array. For near-term car radars, only azimuth accuracy needs to be tested so the cylindrical (rather than the more involved spherical) version of the piecewise flat surface may suffice. The center of the cylinder/sphere outlined partially by the piecewise flat surface should be the approximate center of the radar DUT 499. Since car radars are bistatic, meaning the transmit array is offset from the receive array, the approximate center is roughly the mean of the geometric centers.

In FIG. 4, each tile is a two-dimensional subarray. The car body part surface is arbitrary—it depends on the body part, the make, its fabrication tolerance, whether it is dented or not, etc.

Figure 5:
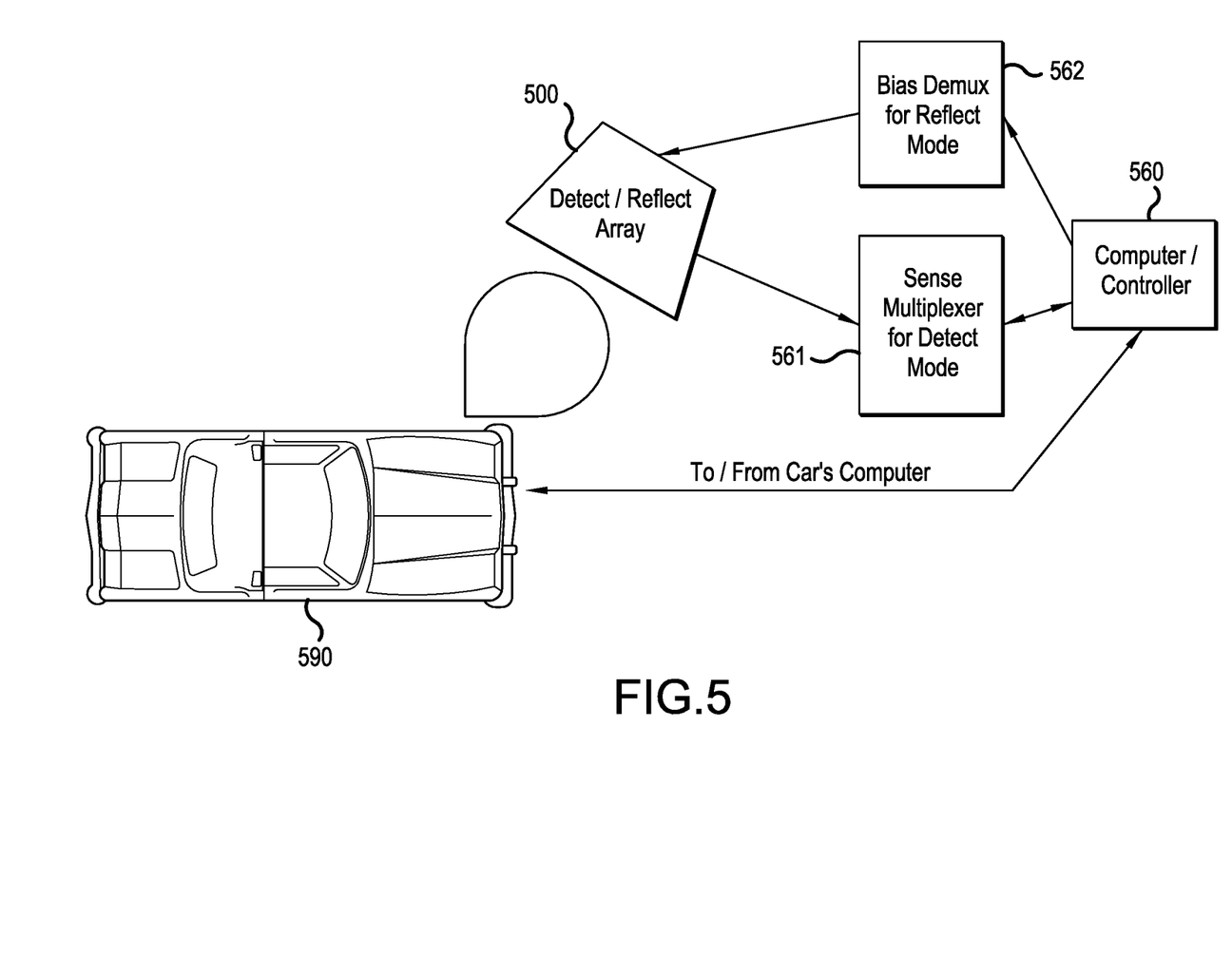
FIG. 5 illustrates a flow for testing an installed automotive arrangement, in accordance with a representative embodiment.

FIG. 5 illustrates a flow for testing an installed automotive arrangement, in accordance with a representative embodiment.

In the embodiment of FIG. 5, testing of a radar for a car 590 is illustrated. In both modes, a computer of the car 590 may communicate with a computer/controller 560 used for testing. The computer of the car 590 tells the computer/controller 560 what the radar for the car 590 is trying to accomplish, and the computer/controller 560 then arranges the appropriate test. For example, the computer of the car 590 may tell the computer/controller 560 that the radar for the car 590 is transmitting a beam at 48° azimuth, and the computer/controller 560 then arranges the test.

Figure 6:
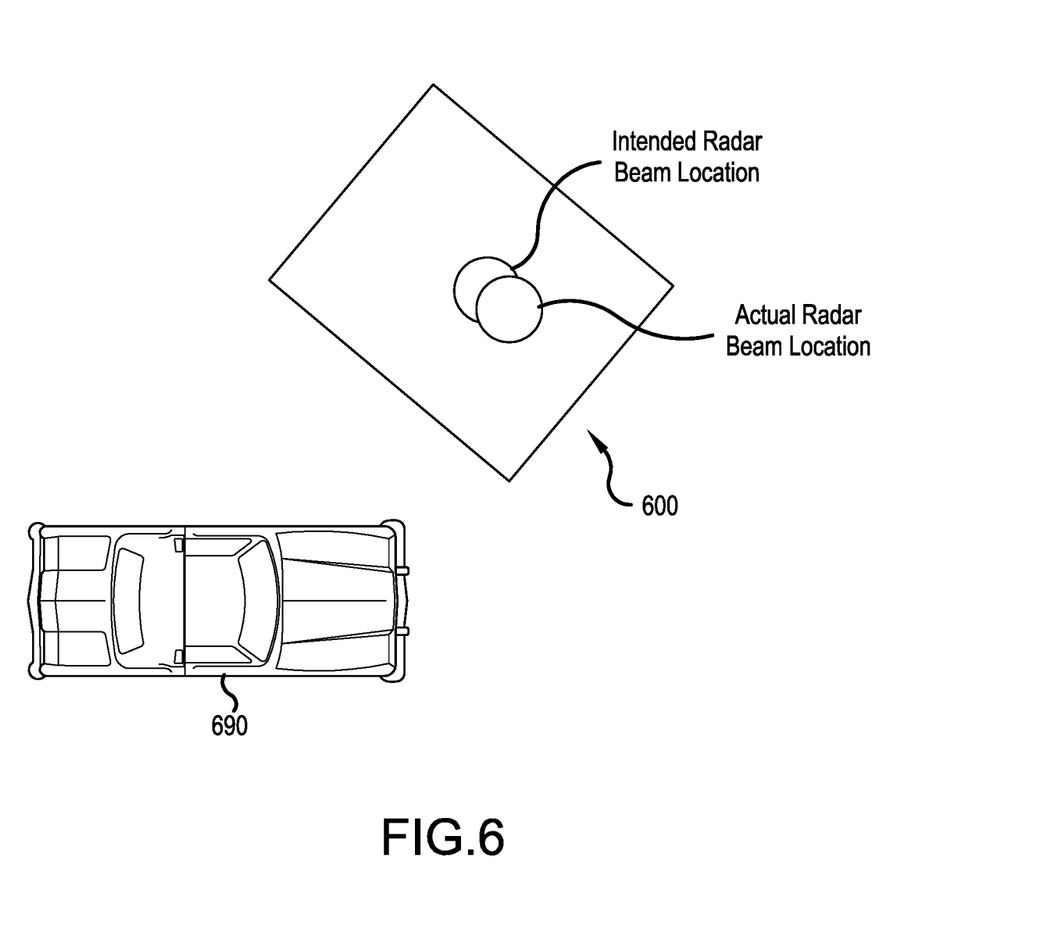
FIG. 6 illustrates a system for testing an installed automotive arrangement using the flow of FIG. 5 in a first use case, in accordance with a representative embodiment.

In detect mode, the transmit function for the radar of the car 590 is tested. This is illustrated in FIG. 6. In the transmit function, the computer/controller 560 sets all the diode biases to zero so that the antenna-diode pair array 100 acts as a millimeter-wave camera. The computer/controller 560 then "polls" the sense multiplexer 561 to scan the antenna-diode pair array 100, thereby collecting the sensed millimeter-wave power across the camera. Image information such as spot center, spot shape, etc. is compared with the desired ideal transmit beam, and if a discrepancy is deemed unacceptable, the antenna-diode pair array 100 can be tweaked to bring the transmitter into conformance or the software that controls the beam forming can be adjusted to correct for the measured offset. The tweaking (physical or software) may be performed by a technician or by the car 590 itself. The tweaking may be mechanical or electrical, or both, to bring the transmitter into conformance.

Figure 7:
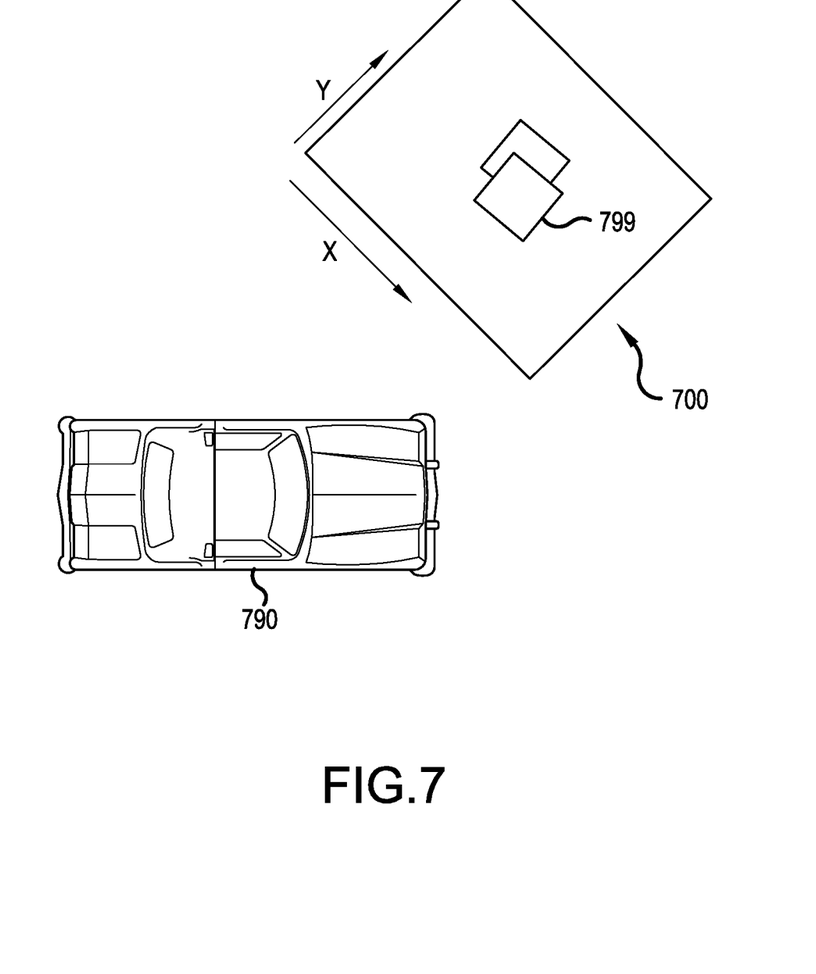
FIG. 7 illustrates a system for testing an installed automotive arrangement using the flow of FIG. 4 in a second use case, in accordance with a representative embodiment.

In reflect mode, DUT transmission and reception are both fully tested. This is illustrated in FIG. 7. In the reflect mode, the test system emulates a radar target at varying angles. For example, azimuth accuracy tests may be important to an automaker, so the computer/controller 560 may instruct the bias demultiplexer 562 to forward bias only the column in the antenna-diode pair array 100 corresponding to the target azimuth while leaving all other columns at zero bias to be nonreflecting. When both azimuth and elevation are targeted, the row and column bias select may be implemented through the bias demultiplexer 562. In the transmission and reception testing in reflect mode, the radar of the car 590 may be provided with a digital signal processor for digital signal processing (DSP) to infer target parameters such as distance, relative velocity, angle. Determination of nonconformance and remediation of the nonconformance may be left to the automaker.

FIG. 6 illustrates a system for testing an installed automotive arrangement using the flow of FIG. 5 in a first use case, in accordance with a representative embodiment.

Since automotive radar antennas are often hidden behind plastic bumper material and the manufacturing tolerances of the plastic bumper parts are crude with respect to the RF wavelength of the radar there may be some interaction with the bumper material that may alter the RF beam shape and position. However, it is important that the location of a detected object agrees with the actual physical position of the object.

In the embodiment of FIG. 6, a car radar is tested using antenna-diode pair array 100 to detect the radar RF stimulus. The radar is set to illuminate a single location rather than scanning. The actual location of the RF energy may be offset from the expected location due to interaction with the bumper material and rough manufacturing tolerances. The antenna-diode pair array 100 allows detection of the actual beam location and measurement of any undesired offsets. This essentially tests the transmit operation and RF beam alignment.

FIG. 7 illustrates a system for testing an installed automotive arrangement using the flow of FIG. 5 in a second use case, in accordance with a representative embodiment.

In the use case of FIG. 7, the ability for the antenna-diode pair array 100 to act as a programmable reflecting target for the automotive radar is shown. Unlike the receiver mode described previously which only tests the Radar DUT 499 transmitter, the approach in the embodiment of FIG. 7 tests both the Radar DUT 499 transmitter and receiver. When the diodes in the antenna array are forward biased they effectively short out those antenna and create a large reflection at the antenna position that the DUT can image. Two reflecting areas may be programmed to be spaced apart and brought closer and closer together to allow measuring the system resolution in X and Y dimensions. Having a programmable reflector capability allows full testing of the Radar DUT 499 for both transmit and reception.

Figure 8:
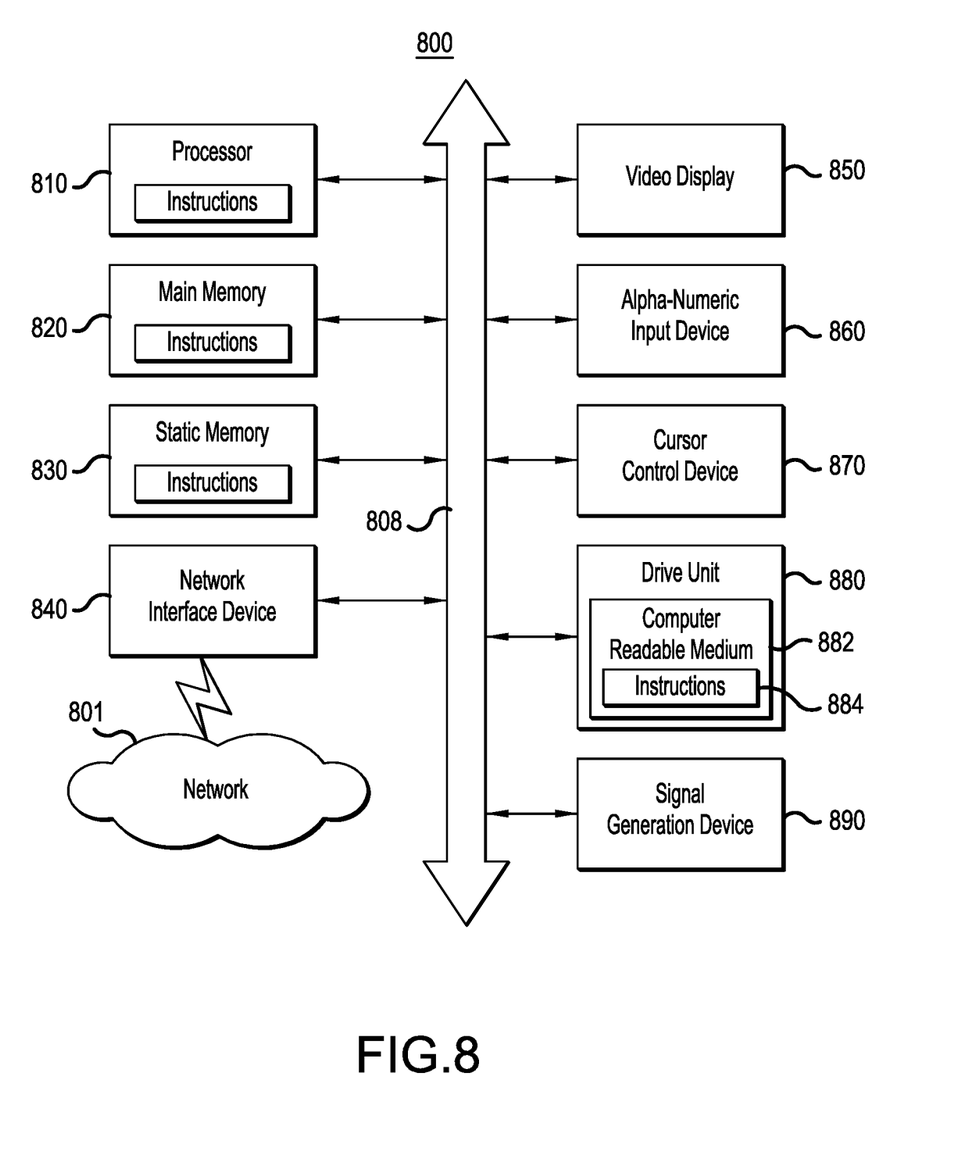
FIG. 8 illustrates a general computer system, on which a method of controlling the two-dimensional array of antenna-diode pairs can be implemented, in accordance with a representative embodiment.

FIG. 8 illustrates a general computer system, on which a method of controlling the two-dimensional array of antenna-diode pairs can be implemented, in accordance with a representative embodiment.

The computer system 800 can include a set of instructions that can be executed to cause the computer system 800 to perform any one or more of the methods or computer-based functions disclosed herein. The computer system 800 may operate as a standalone device or may be connected, for example, using a network 801, to other computer systems or peripheral devices. Any or all of the elements and characteristics of the computer system 800 in FIG. 8 may be representative of elements and characteristics of the computer/controller 560 in FIG. 5 or other similar devices and systems that can include a controller and perform the processes described herein.

In a networked deployment, the computer system 800 may operate in the capacity of a client in a server-client user network environment. The computer system 800 can also be fully or partially implemented as or incorporated into various devices, such as a central station, an imaging system, an imaging probe, a stationary computer, a mobile computer, a personal computer (PC), or any other machine capable of executing a set of instructions (sequential or otherwise) that specify actions to be taken by that machine. The computer system 800 can be incorporated as or in a device that in turn is in an integrated system that includes additional devices. In an embodiment, the computer system 800 can be implemented using electronic devices that provide video or data communication. Further, while the computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 includes a processor 810. A processor 810 for a computer system 800 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. Any processor described herein is an article of manufacture and/or a machine component. A processor for a computer system 800 is configured to execute software instructions to perform functions as described in the various embodiments herein. A processor for a computer system 800 may be a general-purpose processor or may be part of an application specific integrated circuit (ASIC). A processor for a computer system 800 may also be a microprocessor, a microcomputer, a processor chip, a controller, a microcontroller, a digital signal processor (DSP), a state machine, or a programmable logic device. A processor for a computer system 800 may also be a logical circuit, including a programmable gate array (PGA) such as a field programmable gate array (FPGA), or another type of circuit that includes discrete gate and/or transistor logic. A processor for a computer system 800 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 800 includes a main memory 820 and a static memory 830 that can communicate with each other via a bus 808. Memories described herein are tangible storage mediums that can store data and executable instructions and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 800 may further include a video display unit 850, such as a liquid crystal display (LCD), an organic light emitting diode (OLED), a flat panel display, a solid-state display, or a cathode ray tube (CRT). Additionally, the computer system 800 may include an input device 860, such as a keyboard/virtual keyboard or touch-sensitive input screen or speech input with speech recognition, and a cursor control device 870, such as a mouse or touch-sensitive input screen or pad. The computer system 800 can also include a disk drive unit 880, a signal generation device 890, such as a speaker or remote control, and a network interface device 840.

In an embodiment, as depicted in FIG. 8, the disk drive unit 880 may include a computer-readable medium 882 in which one or more sets of instructions 884, e.g. software, can be embedded. Sets of instructions 884 can be read from the computer-readable medium 882. Further, the instructions 884, when executed by a processor, can be used to perform one or more of the methods and processes as described herein. In an embodiment, the instructions 884 may reside completely, or at least partially, within the main memory 820, the static memory 830, and/or within the processor 810 during execution by the computer system 800.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 882 that includes instructions 884 or receives and executes instructions 884 responsive to a propagated signal; so that a device connected to a network 801 can communicate video or data over the network 801. Further, the instructions 884 may be transmitted or received over the network 801 via the network interface device 840.

Accordingly, Millimeter-Wave Detect or Reflect Array enables selective reflecting of an incident microwave signal or millimeter-wave signal, by providing each antenna of the antenna-diode pair array 100 with an input adapted to selectively receive a forward bias signal or a zero bias or a reverse bias signal to apply to each of the diodes 120. This allows selective control of the antenna-diode pair array 100 to operate as a detector that detects an incident microwave signal or millimeter wave signal, or to operate as a reflector that reflects the incident microwave signal or millimeter wave signal.

Although Millimeter-Wave Detect or Reflect Array has been described with reference to several exemplary embodiments, it is understood that the words that have been used are words of description and illustration, rather than words of limitation. Changes may be made within the purview of the appended claims, as presently stated and as amended, without departing from the scope and spirit of Millimeter-Wave Detect or Reflect Array in its aspects. Although Millimeter-Wave Detect or Reflect Array has been described with reference to particular means, materials and embodiments, Millimeter-Wave Detect or Reflect Array is not intended to be limited to the particulars disclosed; Millimeter-Wave Detect or Reflect Array extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed:

1. A device for selectively reflecting an incident microwave signal or millimeter-wave signal, the device comprising:
    a plurality of antennae disposed in an array, each antenna having an input adapted to selectively receive a forward bias signal, or a zero or reverse bias signal;
    a diode disposed at each input of each antenna; and
    a switching device connected to each input, and configured to selectively apply a forward bias, or zero or reverse bias to each of the diodes, wherein in forward bias, each of the plurality of antennae detects the incident microwave signal or millimeter wave signal, and in zero bias or reverse bias, each of the plurality of antennae reflects the incident microwave signal or millimeter wave signal.

2. The device of claim 1, wherein the diode disposed at each input of each antenna is a zero or reverse bias Schottky diode.

3. The device of claim 1, wherein the array comprises a series of rows and a series of columns.

4. The device of claim 3, wherein the plurality of antennae in each of the series of rows are addressable by the switching device as addressed rows.

5. The device of claim 4, wherein in forward bias the addressed rows detect the incident microwave signal or millimeter wave signal.

6. The device of claim 4, wherein in zero bias the addressed rows reflect the incident microwave signal or millimeter wave signal.

7. The device of claim 3, wherein the plurality of antennae in each of the series of columns are addressable by the switching device as addressed columns.

8. The device of claim 7, wherein in forward bias the addressed columns detect the incident microwave signal or millimeter wave signal.

9. The device of claim 7, wherein in zero bias the addressed columns reflect the incident microwave signal or millimeter wave signal.

10. The device of claim 1, further comprising:
    a delay line adapted to receive the incident microwave signal or millimeter wave signal to emulate a distance measurement of a signal strength.

11. The device of claim 1, wherein each of the plurality of antennae are spaced from one another by a distance that is approximately $\lambda/4$, where $\lambda$ is a wavelength of the incident microwave signal or millimeter wave signal.

12. The device of claim 1, wherein each of the plurality of antennae are spaced from one another by a distance that is approximately $\lambda/2$ and a device under test (DUT) transmits a single beam.

13. The device according to claim 1, wherein each input is disposed at a center-tap of each of the antennae.

14. The device according to claim 13, wherein only a direct current voltage is measured at the center-tap.

15. The device according to claim 14, wherein a magnitude of the direct current voltage is proportional to the magnitude of the incident microwave signal or millimeter wave signal.

16. The device according to claim 1, further comprising a plurality of arrays of antennae, wherein each of the plurality of arrays of antennae are substantially flat.

17. The device according to claim 16, wherein the plurality of arrays of antennae are disposed adjacent to one another to form a curved array.

* * * * *